United States Patent

Orlando et al.

[15] 3,673,202

[45] June 27, 1972

[54] 2,5-BIS(2-BENZAZOLYL)HYDROQUINONES AND THEIR DERIVATIVES

[72] Inventors: Charles M. Orlando; Joseph G. Wirth; Darrell R. Heath, all of Schenectady, N.Y.

[73] Assignee: General Electric Company

[22] Filed: Jan. 7, 1970

[21] Appl. No.: 1,316

[52] U.S. Cl. ..................260/304, 252/301.2, 260/307 D, 260/309.2, 260/40
[51] Int. Cl. ...............C07d 91/44, C07d 85/48, C07d 49/38
[58] Field of Search............................260/307 D, 304, 309.2

[56] References Cited

OTHER PUBLICATIONS

Babichev et al., Chem. Abstracts, 70:115062j (1969)

Primary Examiner—Alex Mazel
Assistant Examiner—R. J. Gallagher
Attorney—James W. Underwood, Paul A. Frank, Richard R. Brainard, Joseph T. Cohen, Charles T. Watts, Frank L. Neuhauser, Oscar B. Waddell and Joseph B. Forman

[57] ABSTRACT

The subject compounds fluoresce in the visible and near-infrared regions of the spectrum when exposed to ultraviolet light. The particular color emitted (from blue to near-infrared) is dependent upon whether the hydrogen of the hydroxyl groups is present or has been replaced with various substituents, and upon the other hetero-atom in the benzazole ring. The compounds are photochemically and thermally stable and can be dissolved in organic solvents. They can be incorporated in various polymers to impart their fluorescent properties to the polymers which can be used to produce films, molded objects, or applied as coatings on the envelopes of ultraviolet lamps to produce various colored lights when energized.

10 Claims, No Drawings

2,5-BIS(2-BENZAZOLYL)HYDROQUINONES AND THEIR DERIVATIVES

This invention relates to 2,5-bis(2-benzazolyl)-hydroquinones and their derivatives. More specifically, this invention relates to the chemical compounds having the formula,

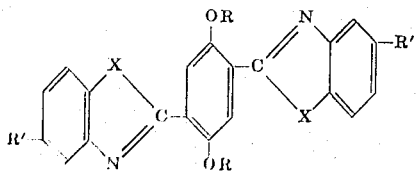

where each R' is hydrogen or lower alkyl, each R is hydrogen, lower alkyl, lower alkylcarbonyl, lower alkoxycarbonyl, benzoyl, or phenoxycarbonyl, and each X is —S—, —O—, or

where R is defined above. When exposed to a source of ultraviolet light, these compounds fluoresce, emitting light in the visible to near-infrared region of the spectrum. The particular color which they emit depends on the R and X substituents.

Although there are many known organic compounds which have fluorescent properties, generally the visible light which they emit is so weak that they cannot be incorporated in minor amounts into other compositions to impart fluorescent properties thereto. Only a very few organic compounds have strongly fluorescent properties so that they can be used in such applications. However, these materials generally are photochemically, oxidatively or thermally unstable at moderately elevated temperatures so that upon long term exposure to ultraviolet light or air, and especially at elevated temperatures, they lose their fluorescent properties.

For most applications, requiring long term stability of the fluorescent properties, inorganic phosphors have been used. Unlike organic materials, which depend upon their chemical structure for the fluorescent properties, inorganic materials depend upon a particular crystal structure for their fluorescent properties. This means that they cannot be used in solution and also when incorporated as a solid into other compositions, care must be taken not to destroy the crystal structure responsible for the fluorescent property. For example, when incorporating such inorganic phosphors as a pigment in a paint or other coating composition, great care must be taken not to shear or grind the pigment, thereby, destroying its crystal structure during the operations necessary to disperse the pigment in the paint or coating composition.

As a powder or dispersed pigment, one particle overlaying another particle will shield the latter from the exciting light. This means that there is a practical limitation, both on the concentration of the dispersed pigment in the coating composition as well as on the thickness of the coating composition which is deposited on an object if it is desired to excite from one side of the layer, for example, a self-supporting film or a coating on a transparent substrate, and have the light emitted from the fluorescent pigment visible on the other side.

We have now discovered that the 2,5-bis(2-benzazolyl)-hydroquinones, having the above formula, can be prepared by relatively simple reactions. Where the benzazolyl group is benzothiazolyl or benzimidazolyl, the compounds are prepared by reacting 2,5-dihydroxyterephthalaldehyde, its ethers or the bisulfite adducts of either one with 2-mercaptoaniline (2-aminothiophenol), 1,2-diaminobenzene (o-phenylene diamine) or either of these compounds having a substituent in the 4-position. Where the benzazolyl group is benzoxazolyl, the compounds are prepared by reacting 2,5-dihydroxyterephthalic acid or its ethers with 2-aminophenol or 4-substituted 2-aminophenol in polyphosphoric acid. In this reaction, de-etherification occurs so that there is no advantage of starting with the ether. Further details of the reaction conditions are given in the examples and in the following literature articles, hereby incorporated by reference, which apply the same reactions to the preparation of other compounds: H.W. Hofmann, Ber., 13, 1236 (1880); H.P. Lankelina and P.X. Sharnoff, J. Am. Chem. Soc., 53, 2654 (1931); H.F. Ridley, R.G.W. Spickett and G.M. Timmis, J. Heterocyclic Chem., 2, 453 (1965); D. Jerchel, H. Fischer and M. Krocht, Ann., 575, 162 (1952); and D.W. Hein, R.J. Alheim and J.J. Leavitt, J. Am. Chem. Soc., 79, 427 (1957); U.S. Patent 2,985,661.

In addition to preparing the ether derivatives as discussed above, the hydroxyl group of the 2,5-bis(2-benzazolyl)hydroquinones can be etherified or esterified by methods well-known in the art for etherifying or esterifying the hydroxyl group of a phenol, for example, reaction with dialkyl sulfates, alkyl halides, etc., for the ethers and reaction with acyl halides, including haloformates, acyl an-hydrides, etc., for the esters. When the etherification or esterification reaction is carried out on the 2,5-bis(2-benzimidazolyl)hydroquinones, it will be evident that the

group will react with the etherification or esterification agent and be converted to the

group in the same way that the —OH group is converted to the —OR group.

We use the term "benzazolyl" as a generic term to include benzoxazolyl substituents derived from the 2-amino-phenols, benzathiazolyl substituents derived from the 2-mercaptoanilines and benzimidazolyl substituents derived from the 1,2-diaminobenzenes. These 2,5-bis(2-benzazolyl)hydroquinones and their ether and ester derivatives are strongly fluorescent when irradiated with ultraviolet light. The compounds are soluble in organic solvents and even very dilute solutions (less than 1 percent by weight) fluoresce strongly. The intensity of fluorescence is apparently invariant with exciting wavelengths in the region of from about 3,000–3,7000 A and 3,750–4,500 A. The compounds are photochemically, oxidatively and thermally stable and melt without decomposition, at least if the melting point is less than 350° C. Therefore, they can be readily incorporated into a polymeric matrix, preferably one which is essentially colorless, by either solution or melt processing techniques. Only a very small amount, one percent by weight or less, is required to impart the strongly fluorescent color properties to the objects fabricated from the polymeric composition.

The relationship between the color which is emitted by these compounds when excited by ultraviolet light and the particular R and X substituents is as follows. The R' substituents and their position in the ring have no effect on the emitted color but when they are other than hydrogen, they increase the solubility of the compounds in organic solvents. When R' is to be other than hydrogen, our compounds where it is in the 4- or para position with respect to X and are lower alkyl, as defined hereinafter for R, are more readily prepared and are preferred. When the R substituents are other than hydrogen, they increase the solubility of the compounds in organic solvents and, if on the oxygen, i.e., are —OR, shift the wavelength of the emitted color to shorter wavelengths.

The wavelength of the emitted light is also influenced by whether X is —O—, —S—, or

. In this series, the wavelength of the emitted light increases from the former to the latter, but the nature of R in the

has no detectable effect. When each R is hydrogen and each X is

, the compounds fluoresce in the near-infrared region with very little fluorescence in the visible red region. Noticeable shifting from the near-infrared into the visible red region is accomplished by replacing the

groups with —S— groups with still further shifting into the visible red region being accomplished by replacing the

groups with —O— groups.

Substantial shifts with any of these three series of compounds are obtained by changing the R in the —OR groups from hydrogen to alkyl, alkoxycarbonyl or aryloxycarbonyl, i.e., conversion of the —OH groups of the hydroquinone compounds to the corresponding ethers or esters, including carbonate esters. Even the very simple diethers, for example, the lower alkyl ethers, or the simple diesters, for example, the lower alkyl carboxylate or lower alkylcarbonate esters in the aliphatic series or benzoate or phenylcarbonate esters in the aromatic series shift the wavelengths of the emitted light into the blue region. Intermediate colors between reds of the hydroquinones and blues of the ethers and esters, for example, oranges, yellows, and greens can be obtained by varying the degree of etherification or esterification from 0 to 100 percent.

Insofar as we can determine the number of carbon atoms in the ether or ester group has no effect on the emitted color. Apparently the loss in hydrogen bonding between the —OH of the hydroquinone and —N= of the benzazolyl substituent, that occurs on replacing the hydrogen of the hydroxyl group with either an ester or ether group accounts for the shift in color. The degree of replacement determines the amount of shift rather than either the number of carbon atoms in the replacing group or whether it is an ether or ester group. Although solubility of these compounds in organic solvents increases somewhat as the number of carbon atoms in the R and R′ groups increases, solubility of the compounds where these groups are hydrogen or have from one to eight carbon atoms, is sufficient for all applications. Therefore, there is no incentive for having these groups be anything but hydrogen or, when alkyl, to be anything but lower alkyl, i.e., having from one to eight carbon atoms, for example, methyl, ethyl, propyl, isopropyl, butyl (including the various butyl isomers), the various pentyl isomers, the various hexyl isomers (including cyclohexyl), the various heptyl isomers and the various octyl isomers.

In the case of the R in —OR groups, it will be recognized by those skilled in the art, that the production of an ester group is usually more convenient than the production of ether groups on a hydroxyl group. Also, if the etherification or esterification reaction is performed on the benzimidazoylhydroquinones having both

and —OH groups, each group will be converted to its corresponding

or —OR group.

In view of the above, there is no incentive to have R be anything but the simpler and more readily derived substituents. The hydroquinones and ether derivatives are discussed above. The following is applicable to the esters, i.e., R is the carbonyl or oxycarbonyl containing moiety of the ester group. In the aromatic series, there would be no incentive to have the R substituents be anything other than benzoyl or phenoxycarbonyl and in the aliphatic series there would be no incentive to have them be anything other than lower alkylcarbonyl or lower alkyloxycarbonyl wherein the alkyl moiety is the same as given above with reference to lower alkyl, i.e. can be represented by the formulas

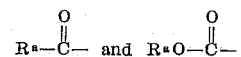

where R″ is lower alkyl or phenyl.

It will be recognized by those skilled in the art that it would be possible to have R be alkenylcarbonyl by first making the desired hydroquinone with free hydroxyl groups and thereafter esterification of the hydroxyl groups with the appropriate olefinic acyl halide or anhydride, for example, acrylyl halide or acrylic anhydride, etc., to produce our fluorescent compounds which were capable of being polymerized along or to produce copolymers with other olefinic unsaturated polymerizable compounds, for example, styrene, methyl methacrylate, etc., to produce polymers which had the fluorescent moiety incorporated directly into the polymer molecule. However, since our compounds can be incorporated into polymers more easily by the mixing technique described above than by this polymerization technique, there is little incentive to prepare such unsaturated derivatives.

It will also be evident to those skilled in the art that one of the benzazolyl substituents can have a different X than the other benzazolyl substituents, for example, one could be a benzoxazolyl substituent and the other could be a benzimidazolyl substituent. However, to isolate such a compound would require its separation from a mixture which contained the two symmetrical compounds. Furthermore, the fluorescent color obtained from such a compound could more readily be obtained by merely mixing the two symmetrical compounds. Furthermore, the variation in the degree of esterification or etherification of the hydroxyl group of the hydroquinone moiety has a greater effect on the color shift. Therefore, when a fluorescent color is desired which is different than that of the symmetrical compound it is more easily and readily obtained by control of the degree of etherification or esterification of the free hydroxyl group of the hydroquinone moiety or by blending of the fully esterified or etherified compound with the unesterified or unetherified hydroquinone compound. It is possible to obtain the same shift as obtained by etherification or esterification by producing the alkali metal salts. However, the salts are less soluble in organic solvents and polymers than the hydroquinone or especially its ethers or esters. Because of this, it is preferred to obtain these color shifts by making ethers or esters in the manner described above.

In order that those skilled in the art can readily understand my invention, the following examples are given by way of illustration and not by way of limitation. In all of the examples, parts and percentages are by weight and temperatures are in degrees centigrade. Where elemental analyses are given, the calculated values are given in parentheses following the determined values. The wavelengths reported are those where the emission spectrum of the crystalline compound shows a maximum.

EXAMPLE 1

A suspension of 0.526 g. of 2,5-dihydroxyterephthalaldehyde in a solution of 0.8 g. of 2-mercaptoaniline in 25 ml. of ethylene glycol was heated for 2 hours at 180°. The reaction mixture never became homogeneous during the period of heating. Cooling the reaction mixture to room temperature and filtration removed the precipitate which was recrystallized from dimethylformamide yielding 0.322 g. of 2,5-bis(2-benzothiazolyl)hydroquinone as yellow crystals having a melting point of 344° – 346°, whose emission spectrum showed a maximum at 6,500 A with a shoulder at 7,300 A and a broad tail to 10,000 A.

Elemental Analysis showed: C, 63.40 (63.80); H, 3.20 (3.24); N, 7.33 (7.49).

EXAMPLE 2

A suspension of 0.64 g. of 1,2-diaminobenzene and 1.12 g. of the bis-bisulfite adduct of 2,5-dihydroxytere-phthalaldehyde in 50 ml. of dimethylformamide was heated at 150° for 3 hours. A homogeneous solution was noted after ½ hour at 150°. Upon cooling to room temperature, the reaction mixture deposited crystals which were removed by filtration and recrystallized from dimethylformamide giving 0.30 g. of 2,5-bis(2-benzimidazolyl)hydroquinone as yellow crystals having a melting point of >380° whose emission spectrum showed a maximum at 7,300 A and a broad tail to 9,000 A.

Elemental Analysis showed: C,69.00 (69.35); N, 4.20 (4.12); N, 16.1 (16.2).

EXAMPLE 3

A solution of 1.05 g. of 2,5-dihydroxyterephthalic acid and 1.15 g. of 2-aminophenol in 35 ml. of polyphosphoric acid was heated at 200° for 24 hours. The reaction mixture was quenched with 100 ml. of water, neutralized with solid sodium hydroxide and filtered. The dark solid precipitate was separated and dried under vacuum and vacuum sublimed at 300° at 0.1 mm. pressure to produce a yellow solid. Recrystallization of the sublimate from dimethylformamide gave 1.18 g. of yellow needles having a melting point of 376° – 378° and whose emission spectrum showed a maximum at 6,300 A and a broad tail to 10,000 A.

Elemental Analysis showed: C, 69.20 (69.76); H, 3.50 (3.51); N, 8.32 (8.13).

EXAMPLE 4

A solution of 1.25 g. of the bis-bisulfite adduct of 2,5-dimethoxyterephthaldehyde and 0.669 g. of 1,2-diaminobenzene in 35 ml. of dimethylformamide was heated for 150° for 24 hours. After cooling the solid precipitate was removed by filtration, washed with water and dried. Recrystallization from glacial acetic acid produced 0.56 g. of 2,5-bis(2-benzimidazolyl)-1,4-dimethoxybenzene as amber crystals having a melting point of 358° – 360° with decomposition. The emission spectrum showed a maximum at 4,300 A with a shoulder at 4,500 A.

Elemental Analysis showed: C, 71.50 (71.33); H, 5.0 (4.89); N, 15.1 (15.1).

EXAMPLE 5

A solution of 1.7 g. of the bis-bisulfite adduct of 2,5-dimethoxyterephthaldehyde and 1.05 g. of 2-mercaptoaniline in 35 ml. of dimethylformamide was heated at 150° for 14 hours. Cooling to room temperature produced a dark yellow precipitate which was removed by filtration, washed with water and dried. Recrystallization from dimethylformamide gave 0.8 g. of 2,5-bis(2-benzothiazolyl)-1,4-dimethoxybenzene as yellow-orange needles having a melting point of 315° – 317°. The emission spectrum showed a maximum at 6,000 A with a shoulder at 6,400 A.

Elemental Analysis showed: C, 65.00 (65.32); H, 4.20 (3.98); N, 6.92 (7.13).

Using the appropriate 2,5-dialkoxyterephthalaldehyde in Examples 4 and 5 produces the other lower alkyl ethers of both the 2,5-bis(2-benzimidazolyl)hydroquinone and 2,5-bis-(2-benzothiazolyl)hydroquinone.

EXAMPLE 6

A solution of 1.68 g. of the anil prepared by condensing two moles of 2-hydroxyaniline with one mole of 2,5-dimethoxyterephthalaldehyde, in 50 ml. of glacial acetic acid was stirred at ambient temperature with 5.9 g. of lead tetracetate for 14 hours. The reaction mixture was filtered and the product was recrystallized from acetic acid to give 0.91 g. of 2,5-bis(2-benzoxazolyl)-1,4-dimethoxybenzene as yellow needles having a melting point of 301° – 303°. The emission spectrum showed a maximum of 4,550 A.

Elemental Analysis showed: C, 70.40 (70.95); H, 432 (4.33); N, 7.85 (7.52).

The other lower alkyl ethers of the 2,5-bis(2-benzoxazolyl)hydroquinone are prepared by repeating this example using the appropriate 2,5dialkoxyterephthalaldehyde.

In any of the above examples, the substitution of the 4-alkyl-2-aminophenol, 4-alkyl-2,4-diaminobenzene or 4-alkyl-2-mercaptoaniline for these same compounds not having the alkyl group in the 4-position leads to the corresponding hydroquinones and ethers having an alkyl group in the 5-position of the benzazole substituent. For example, use of 4-methyl-2-mercaptoaniline for the 2-mercapto-aniline in Example 1, produces 2,5-bis(5-methyl-2-benzothiazolyl)hydro-quinone.

EXAMPLE 7

A suspension of 0.62 g. of 2,5-bis(2-benzoxazolyl)-hydroquinone in a mixture of 5 ml. of acetic anhydride and 15 ml. of pyridine was refluxed for 5 hours. After one hour, the reaction mixture became homogeneous and subsequently fine white crystals began to deposit. The reaction mixture was cooled and filtered and vacuum sublimed to give 0.59 g. of 2,5-bis(2-benzoxazolyl)hydroquinone diacetate, as white crystals having a melting point of 301° – 303°. The emission spectrum showed a maximum at 4,350 A.

The diacetate derivative of 2,5-(2-benzothiazolyl-hydroquinone and the tetraacetate derivative of 2,5-(2-benzimidazolyl)hydroquinone are prepared by repeating this example but using equivalent amounts of 2,5-bis(2-benzothiazolyl)hydroquinone and 2,5-bis(2-benzimidazolyl)hydroquinone, respectively.

The diacetate derivatives described in this example also can be prepared by using acetyl chloride in place of the acetic anhydride. Likewise, the other lower alkyl esters can be prepared by using the appropriate alkanoic anhydride or acid halide. Similarly, the dibenzoates, bis(alkyl carbonates) and bis(phenyl carbonates) can be prepared using benzoyl chloride and alkyl- or phenyl-chloroformates, respectively.

The above examples and teachings have illustrated many of the variations and modifications of the invention. Many other wide and useful applications, in addition to those already disclosed may be made of the fluorescent compounds of this invention, especially in resin compositions containing them. For example, lacquers may be made by dissolving the fluorescent compounds together with a film-forming polymer in a suitable solvent and the lacquer so produced used to coat the outside of an ultraviolet producing lamp which, when energized, will produce the fluorescent color of the particular composition of this invention which has been incorporated in the coating on the envelope of the light. The polymeric films containing these compounds of this invention may be irradiated from one side with an ultraviolet light so that the other side will fluoresce with color of the contained compound of this invention. Furthermore, the compound of this invention having the two free hydroxy groups in the hydroquinone moiety can be incorporated as one of the dihydric compounds in polyester and polycarbonate resins. These and other modifications and variations of the present invention are possible in light of the above teachings. It is, therefore, to be understood that changes may be made in the particular embodiments of the invention described which are within the full intended scope of the invention as defined by the appended claims.

We claim:
1. Chemical compounds having the formula,

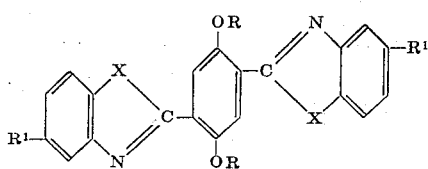

where each $R^1$ is hydrogen or lower alkyl, each R is hydrogen, lower alkyl, lower alkylcarbonyl, lower alkyloxycarbonyl benzoyl or phenoxycarbonyl, and each X is —S—, —O—, or

where R is as defined above.

2. The compounds of claim 1, which are bis(benzoxazolyl) compounds.
3. The compounds of claim 1, which are bis(benzothiazolyl) compounds.
4. The compounds of claim 1, which are bis(benzimidazolyl) compounds.
5. The compounds of claim 1, which are bis(benzoxazolyl)hydroquinones.
6. The compounds of claim 1, which are bis(benzothiazolyl)hydroquinones.
7. The compounds of claim 1, which are bis(benzimidazolyl)hydroquinones.
8. 2,5-bis(2-benzoxazolyl)hydroquinone.
9. 2,5-bis(2-benzothiazolyl)hydroquinone.
10. 2,5-bis(2-benzimidazolyl)hydroquinone.

* * * * *